United States Patent
Mehta et al.

(10) Patent No.: US 7,424,564 B2
(45) Date of Patent: Sep. 9, 2008

(54) PCI—EXPRESS SLOT FOR COUPLING PLURAL DEVICES TO A HOST SYSTEM

(75) Inventors: Parag P Mehta, Ladera Ranch, CA (US); Patrick J. Kennedy, Mission Viejo, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 591 days.

(21) Appl. No.: 10/806,691

(22) Filed: Mar. 23, 2004

(65) Prior Publication Data
US 2005/0215085 A1 Sep. 29, 2005

(51) Int. Cl.
*G06F 13/00* (2006.01)
(52) U.S. Cl. .................. 710/301; 710/305; 710/306
(58) Field of Classification Search ......... 710/301–306, 710/100; 345/502; 361/686, 861
See application file for complete search history.

(56) References Cited

U.S. PATENT DOCUMENTS

| | | | |
|---|---|---|---|
| 2004/0204912 A1* | 10/2004 | Nejedlo et al. | 702/188 |
| 2005/0060452 A1* | 3/2005 | Rengarajan | 710/107 |
| 2005/0088445 A1* | 4/2005 | Gonzalez et al. | 345/502 |
| 2005/0160212 A1* | 7/2005 | Caruk | 710/301 |
| 2005/0186810 A1* | 8/2005 | Sardella et al. | 439/76.1 |
| 2005/0190536 A1* | 9/2005 | Anderson et al. | 361/686 |
| 2005/0240713 A1* | 10/2005 | Wu et al. | 710/314 |

* cited by examiner

*Primary Examiner*—Mark Rinehart
*Assistant Examiner*—Kim T Huynh
(74) *Attorney, Agent, or Firm*—Klein, O'Neill & Singh, LLP

(57) ABSTRACT

A PCI-Express slot for coupling devices to a host system is provided. The slot includes a PCI-Express connector that can couple at least two devices using at least two independent PCI-Express lanes. Four, eight, twelve, sixteen, and/or thirty PCI-Express lanes are used to couple at least two devices, and/or eight PCI-Express lanes are used to couple at least two devices.

21 Claims, 5 Drawing Sheets

PCI—EXPRESS SLOT FOR COUPLING PLURAL DEVICES TO A HOST SYSTEM

BACKGROUND

1. Field of the Invention

The present invention relates to storage systems, and more particularly, to using PCI-Express standard for connecting plural modules.

2. Background of the Invention

Storage area networks ("SAN") are commonly used to store and access data. SAN is a high-speed sub-network of shared storage devices, for example, disks and tape drives. A computer system (may also be referred to as a "host") can access data stored in the SAN.

Typical SAN architecture makes storage devices available to all servers that are connected using a computer network, for example, a local area network or a wide area network. The term server in this context means any computing system or device coupled to a network that manages network resources. For example, a file server is a computer and storage device dedicated to storing files. Any user on the network can store files on the server. A print server is a computer that manages one or more printers, and a network server is a computer that manages network traffic. A database server is a computer system that processes database queries.

Various components and standard interfaces are used to move data from host systems to storage devices in a SAN. Fibre channel is one such standard. Fibre channel (incorporated herein by reference in its entirety) is an American National Standard Institute (ANSI) set of standards, which provides a serial transmission protocol for storage and network protocols such as HIPPI, SCSI (small computer system interface), IP, ATM and others. Fibre channel provides an input/output interface to meet the requirements of both channel and network users.

Host systems often communicate via a host bus adapter ("HBA") using the "PCI" bus interface. PCI stands for Peripheral Component Interconnect, a local bus standard that was developed by Intel Corporation®. The PCI standard is incorporated herein by reference in its entirety. Most modern computing systems include a PCI bus in addition to a more general expansion bus (e.g. the ISA bus). PCI is a 64-bit bus and can run at clock speeds of 33 or 66 MHz.

PCI-X is a standard bus that is compatible with existing PCI cards using the PCI bus. PCI-X improves the data transfer rate of PCI from 132 MBps to as much as 1 GBps. The PCI-X standard was developed by IBM®, Hewlett Packard Corporation® and Compaq Corporation® to increase performance of high bandwidth devices, such as Gigabit Ethernet standard and Fibre Channel Standard, and processors that are part of a cluster.

PCI-Express (may also be referred to as "PCI-Exp") is another industry standard that is being developed to allow data transfer at 2.5 Gigabits/second and has a layered structure. PCI-Exp provides a dual-simplex channel that is implemented as a transmit and receive pair.

PCI-Exp link consists of two low-voltage, differentially driven pair of signals, i.e. a transmit pair and a receive pair. A data clock is embedded using an 8b/10b-encoding scheme to achieve high data rates. A PCI-Exp physical layer is used to transport packets between link layers of two PCI-Exp agents. Adding signal pairs to form multiple lanes may linearly scale the bandwidth of a PCI-Exp lane. The current PCI-Exp physical layer can support a ×1(single), ×2 (double), ×4 (four), ×8(eight), ×12 (twelve), ×16(sixteen) and ×32 (thirty two) lane widths.

As discussed above, servers to interact with storage subsystems use adapters. Often multiple adapters are used in complex systems. In order to couple plural adapters to a host system (for example, the host system 101A, FIG. 1A), a bridge is required. FIG. 1D block diagram shows two adapters (A and B) 106 that are coupled to a bridge 106A allowing host system 101A access to both the adapters A and B. The cost of using bridge 106A is not commercially desirable.

Therefore, there is a need for a system that allows multiple adapters to be coupled to a host system without using a bridge and preferably using the same PCI-Exp slot.

SUMMARY OF THE INVENTION

In one aspect of the present invention, a PCI-Express slot for coupling devices to a host system is provided. The slot includes a PCI-Express connector that can couple at least two devices using at least two independent PCI-Express lanes. Four, eight, twelve, sixteen, and/or thirty PCI-Express lanes are used to couple at least two devices, and/or eight PCI-Express lanes are used to couple at least two devices.

In another aspect of the present invention, a system for coupling plural adapters to a host system is provided. A motherboard with a PCI-Express slot having a PCI-Express connector that can couple at least two devices using at least two independent PCI-Express lanes.

In yet another aspect of the present invention, a PCI-Express connector in a PCI-Express slot for coupling devices to a host system is provided, where the connector can couple at least two devices using at least two independent PCI-Express lanes.

In one aspect of the present invention, a bridge is not needed to couple plural adapters to a host system using the PCI-Exp bus.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

To facilitate an understanding of the preferred embodiment, the general architecture and operation of a system using storage devices will be described. The specific architecture and operation of the preferred embodiment will then be described with reference to the general architecture.

Figure 1A:
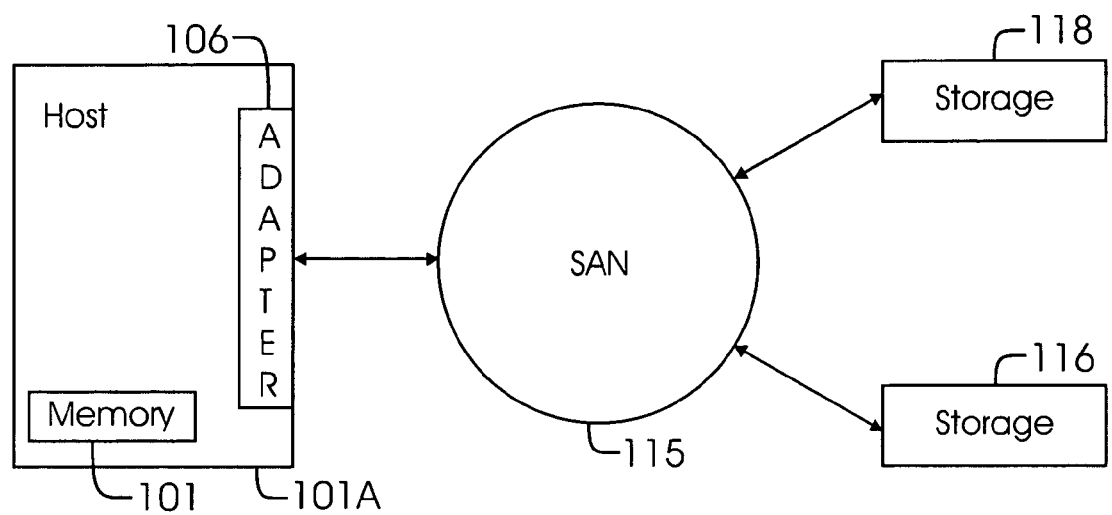
FIG. 1A shows a host system with an adapter coupled to a storage subsystem, used according to one aspect of the present invention.

FIG. 1A shows a host system 101A with memory 101 coupled to a SAN 115 that is coupled to storage subsystem 115. In the FIG. 1B example, Host 101A has access to storage sub-systems 116 and 118. It is noteworthy that a host system 101A, as referred to herein, may include a computer, server or other similar devices, which may be coupled to storage systems. Host system 101A includes a host processor, random access memory ("RAM"), and read only memory ("ROM"), and other components to communicate with various SAN modules, as described below.

Figure 1B:
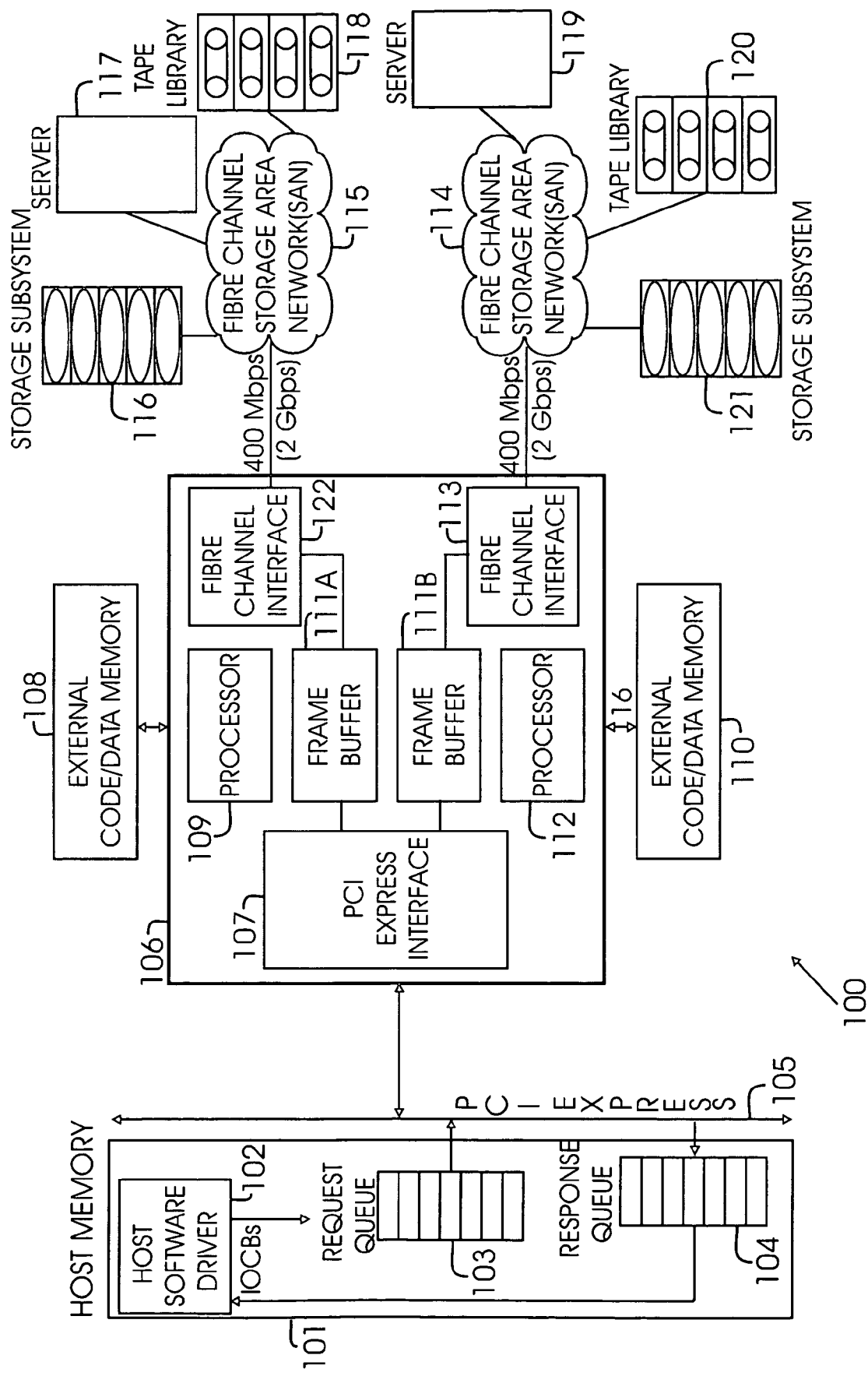
FIG. 1B shows a block diagram with details of an adapter, used according to one aspect of the present invention.

FIG. 1B shows a system 100 that uses a controller/adapter 106 (referred to as "adapter" 106) for communication between a host system 101A with host memory 101 to various storage systems (for example, storage subsystem 116 and 121, tape library 118 and 120) using fibre channel storage area networks 114 and 115. Servers 117 and 119 can also access the storage sub-systems (for example, 116 and 121) using SAN 115 and 114, respectively.

Host system 101A communicates with adapter 106 via a PCI-Exp bus 105 through a PCI-Exp interface 107. Adapter 106 includes processors 112 and 109 for the receive and transmit side, respectively. Processor 109 and 112 may be a RISC processor.

Transmit path in this context means data coming from host memory 101 to the storage systems via adapter 106. Receive path means data coming from storage subsystem via adapter 106. It is noteworthy, that only one processor can be used for receive and transmit paths, and the present invention is not limited to any particular number/type of processors.

Adapter 106 also includes fibre channel interface (also referred to as fibre channel protocol manager "FPM") 122 and 113 in receive and transmit paths, respectively. FPM 122 and 113 allow data to move to/from storage systems 116, 118, 120 and 121.

Adapter 106 includes external memory 108 and 110 and frame buffers 111A and 111B that are used to move information to and from the host to other SAN components.

Host memory 101 includes a response queue 104 and a request queue 103 to move information to and from host memory 101 using a driver 102.

Figure 1C:
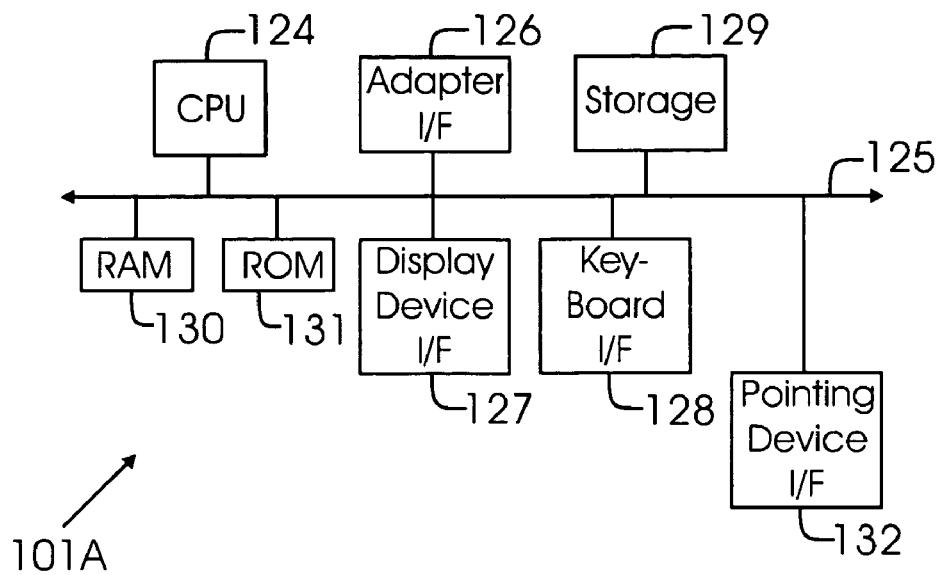
FIG. 1C shows the internal architecture of a host system, used according to one aspect of the present invention.
Figure 1D:
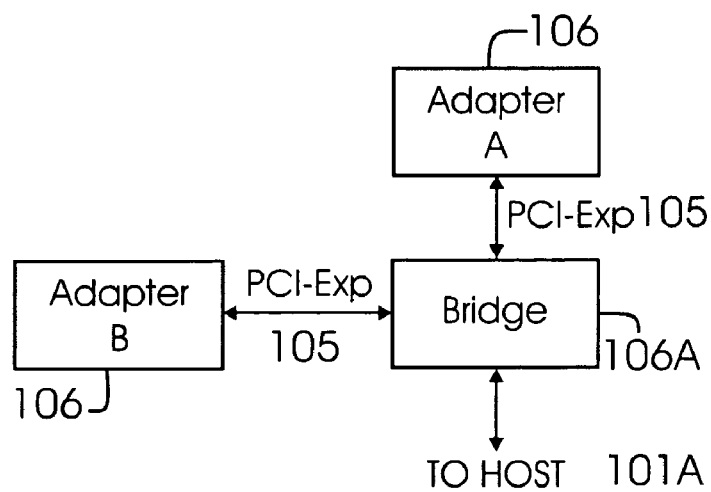
FIG. 1D shows a top-level block diagram where two adapters are connected to a host system using a bridge.

FIG. 1C is a block diagram showing the internal functional architecture of host system 101A. As shown in FIG. 1C, host system 101A includes a microprocessor or central processing unit ("CPU") 124 for executing computer-executable process steps and interfaces with a computer bus 125 (similar to PCI-Exp bus 105). Also shown in FIG. 1C is an adapter interface 126 (similar to PCI-Exp interface 107) that interfaces host system 101A with adapter 106. Host system 101A also includes a display device interface 127, a keyboard interface 128, a pointing device interface 132, and a storage device interface 129 (for example, a disk, CD-ROM or any other device).

Storage 129 stores operating system program files, application program files, and other files. Some of these files are stored on storage 129 using an installation program. For example, CPU 124 executes computer-executable process steps of an installation program so that CPU 124 can properly execute the application program.

A random access main memory ("RAM") 130 also interfaces to computer bus 125 to provide CPU 124 with access to memory storage. When executing stored computer-executable process steps from storage 129, CPU 124 stores and executes the process steps out of RAM 130.

Read only memory ("ROM") 131 is provided to store invariant instruction sequences such as start-up instruction sequences or basic input/output operating system (BIOS) sequences for operation of a keyboard (not shown).

Figure 2A:
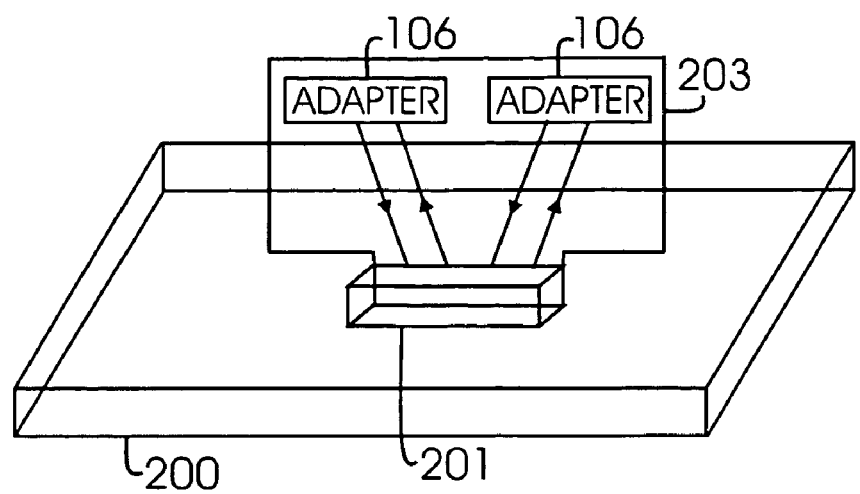
FIGS. 2A and 2B show block diagrams where the same PCI-Exp connector is used to couple more than one adapter, according to one aspect of the present invention.
Figure 2B:
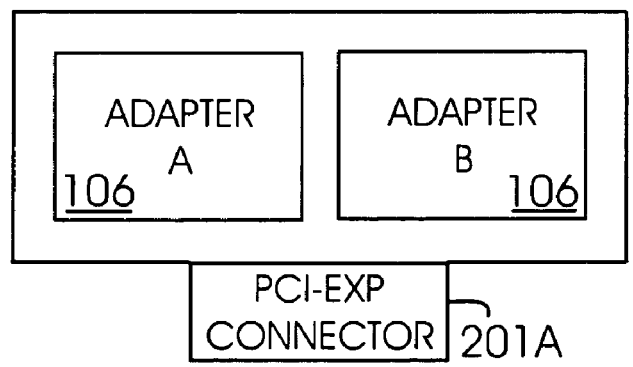

FIG. 2A shows a block diagram where a motherboard 200 is used in host system 101A and includes a PCI-Exp slot 201. Slot 201 includes a PCI-Exp connector 201A (FIG. 2B). A card 203 is placed in slot 201 and connector 201A is used to connect two adapters (A and B) 106 to host system 101A.

Figure 2C:
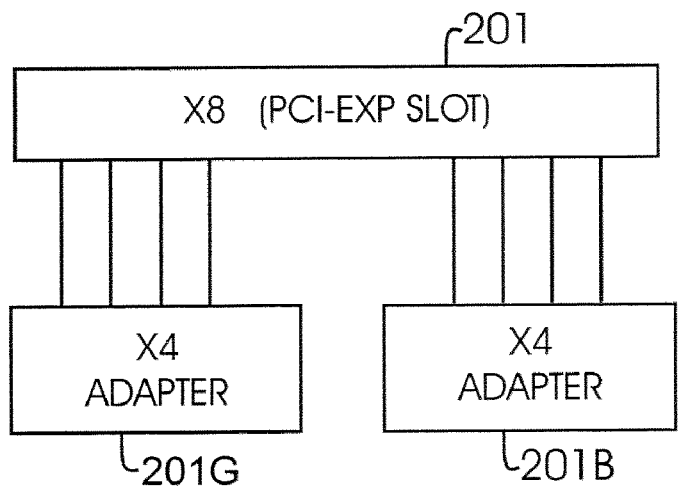
FIGS. 2C and 2D show a block diagram where the same PCI-Exp connector is used to couple plural adapters, according to one aspect of the present invention.
Figure 2D:
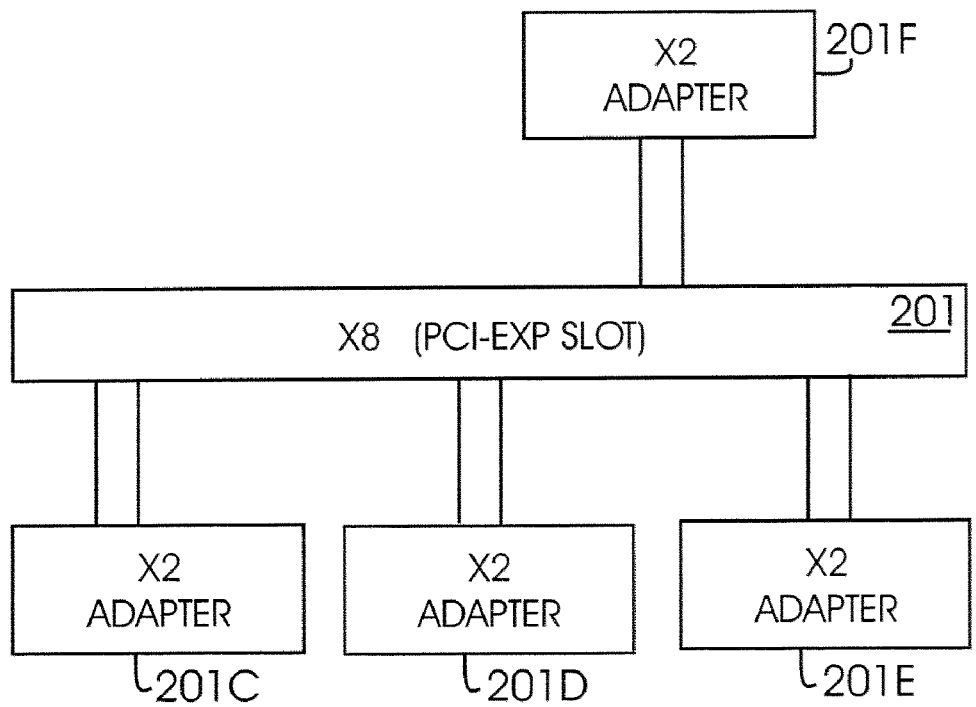

It is noteworthy that although the example in FIGS. 2A and 2B show two adapters, the present adaptive aspects of the present invention are not limited to any particular number of adapters. For example, in FIG. 2C, PCI-Exp slot 201 is shown where two devices 201G and 201B (adapters A and B) are coupled using ×4 (i.e. 4 lanes each) in an ×4 configuration. FIG. 2D also shows PCI-Exp slot 201 that couples four devices 201C-201F using the ×2 (two lanes) configuration. Similarly, other devices can be used in ×12, ×16 and ×32 configuration.

Although the foregoing examples show how adapters in the SAN environment being coupled using the PCI-Exp bus, the present invention is not limited to any particular type of adapter. For example, plural cards in other environments (for example, multi-media, graphics, or printing) may be coupled using the adaptive aspects of the present invention.

In one aspect of the present invention, a bridge is not needed to couple plural adapters to a host system using the PCI-Exp bus.

Although the present invention has been described with reference to specific embodiments, these embodiments are illustrative only and not limiting. Many other applications and embodiments of the present invention will be apparent in light of this disclosure and the following claims.

What is claimed:

1. A PCI-Express slot for coupling PCI-Express devices to a host system including a processor, the PCI-Express slot comprising:
   a PCI-Express connector for receiving a card having at least two independent PCI-Express devices, each independent PCI-Express device using an independent set of PCI-Express lanes;
   wherein the PCI-Express slot is located on a motherboard of the host system and the host system processor communicates with the at least at least two independent PCI-Express devices via the two independent sets of PCI-Express lanes without using a bridge.

2. The PCI-Express slot of claim 1, wherein four PCI-Express lanes are used to couple the at least two independent PCI-Express devices.

3. The PCI-Express slot of claim 1, wherein eight PCI-Express lanes are used to couple the at least two independent PCI-Express devices.

4. The PCI-Express slot of claim 1, wherein twelve PCI-Express lanes are used to couple at least two independent PCI-Express devices.

5. The PCI-Express slot of claim 1, wherein sixteen PCI-Express lanes are used to couple the at least two independent PCI-Express devices.

6. The PCI-Express slot of claim 1, wherein thirty two PCI-Express lanes are used to couple the at least two independent PCI-Express devices.

7. The PCI-Express slot of claim 1, where ×2, ×4, ×8, ×12, ×12, ×16 or ×32 PCI-Express lane configurations are used to couple the at least two independent PCI-Express devices.

8. A system for coupling plural PCI-Express devices to a host system including a processor, the system comprising:

a motherboard with a PCI-Express slot having a PCI-Express connector configured to receive a card having at least two independent PCI-Express devices, each independent PCI-Express device using an independent set of PCI-Express lanes;

wherein the host system processor communicates with the at least two independent PCI-Express devices via the two independent sets of PCI-Express lanes without using a bridge.

9. The system of claim 8, wherein four PCI-Express lanes are used to couple the at least two independent PCI-Express devices.

10. The system of claim 8, wherein eight PCI-Express lanes are used to couple the at least two independent PCI-Express devices.

11. The system of claim 8, wherein twelve PCI-Express lanes are used to couple the at least two independent PCI-Express devices.

12. The system of claim 8, wherein sixteen PCI-Express lanes are used to couple the at least two independent PCI-Express devices.

13. The system of claim 8, wherein thirty two PCI-Express lanes are used to couple the a least two independent PCI-Express devices.

14. The system of claim 8, wherein ×2, ×4, ×8, ×12, ×12, ×16 or ×32 PCI-Express lane configurations are used to couple the at least two independent PCI-Express devices.

15. A PCI-Express connector in PCI-Express slot on a mother board of a host system, the host system including a processor, the connector being configured to receive a card having at least two independent PCI-Express devices to couple the independent PCI-Express devices to the host system, each independent PCI-Express device using an independent set of PCI-Express lanes, wherein the host system processor communicates with the at least two independent PCI-Express devices via the two independent sets of PCI-Express lanes without using a bridge.

16. The PCI-Express connector of claim 15, wherein four PCI-Express lanes are used to couple the at least two independent PCI-Express devices.

17. The PCI-Express connector of claim 15, wherein eight PCI-Express lanes are used to couple the at least two independent PCI-Express devices.

18. The PCI-Express connector of claim 15 wherein twelve PCI-Express lanes are used to couple the at least two independent PCI-Express devices.

19. The PCI-Express connector of claim 15, wherein sixteen PCI-Express lanes are used to couple the at least two independent PCI-Express devices.

20. The PCI-Express connector of claim 1 wherein thirty two PCI-Express lanes are used to couple the at least two independent PCI-Express devices.

21. The PCI-Express connector of claim 15, wherein ×2, ×4, ×8, ×12, ×12, ×16 or ×32 PCI-Express late configurations are used to couple the at least two independent PCI-Express devices.

* * * * *

UNITED STATES PATENT AND TRADEMARK OFFICE
CERTIFICATE OF CORRECTION

PATENT NO. : 7,424,564 B2  Page 1 of 1
APPLICATION NO. : 10/806691
DATED : September 9, 2008
INVENTOR(S) : Parag P Mehta et al.

It is certified that error appears in the above-identified patent and that said Letters Patent is hereby corrected as shown below:

In column 4, line 47, in Claim 1, after "at least" delete "at least".

In column 5, line 26, in Claim 13, delete "a" and insert -- at --, therefor.

In column 6, line 1, in Claim 15, delete "in" and insert -- in a --, therefor.

In column 6, line 17, in Claim 18, delete "15" and insert -- 15, --, therefor.

In column 6, line 23, in Claim 20, delete "1" and insert -- 15, --, therefor.

In column 6, line 27, in Claim 21, delete "late" and insert -- lane --, therefor.

Signed and Sealed this

Eleventh Day of May, 2010

David J. Kappos
*Director of the United States Patent and Trademark Office*